United States Patent [19]
Nishino

[11] Patent Number: 4,776,551
[45] Date of Patent: Oct. 11, 1988

[54] SEAT SLIDE DEVICE

[75] Inventor: Takaichi Nishino, Akishima, Japan

[73] Assignee: Tachi-S Co., Ltd., Tokyo, Japan

[21] Appl. No.: 82,342

[22] Filed: Aug. 6, 1987

[51] Int. Cl.4 .............................................. F16M 13/00
[52] U.S. Cl. .................................... 248/429; 248/430; 312/341 R
[58] Field of Search ............... 248/429, 430, 424, 419; 297/473; 312/341 R, 342, 343

[56] References Cited

U.S. PATENT DOCUMENTS

| | | | |
|---|---|---|---|
| 4,072,347 | 2/1978 | Boisset | 248/429 X |
| 4,204,658 | 5/1980 | Courtois | 248/430 |
| 4,533,107 | 8/1985 | Okazaki et al. | 248/430 |
| 4,621,784 | 11/1986 | Kaesling et al. | 248/430 |
| 4,666,209 | 5/1987 | Kazaoka et al. | 248/429 X |
| 4,671,571 | 6/1987 | Gionet | 248/429 X |

Primary Examiner—Ramon O. Ramirez
Attorney, Agent, or Firm—Cushman, Darby & Cushman

[57] ABSTRACT

A seat slide device adapted to adjust the forward and rearward positions of an automobile seat, comprising an upper rail, a lower rail, the upper rail being slidably fitted to the lower rail, and a reinforcing member. The reinforcing member is fixed to the upper rail and has a plurality of claw members which are engageable with the lower rail. When a pulling force is applied to the upper rail, the claw members are engaged with the lower rail so as to prevent the removal of the upper rail from the lower rail as well as the longitudinal dislocation of the upper rail relative to the lower rail.

9 Claims, 3 Drawing Sheets

SEAT SLIDE DEVICE

BACKGROUND OF THE INVENTION

1. Field of the Invention

The present invention relates to a seat slide device for an automotive seat, which is adapted to adjust the forward and backward positions of the seat, and more particularly relates to an improvement on a seat slide device comprising upper and lower rails, the upper rail being slidably fitted to the lower one, in which a seat belt is at its one end anchored to the upper rail, in order that the upper rail is prevented from its removal out of the lower rail.

2. Description of the Prior Art

Most of generally designed seat slide devices are essentially composed of a lower rail to be fixed to the floor of an auotmobile and an upper rail to be fixed to the bottom surface of a seat, with such on arrangement that the upper rail is fitted to the lower rail in a slidable fashion. In actual use, a pair of thus-constructed slide devices are each provided on the respective lateral sides of a seat.

Referring to FIG. 1 of the accompanying drawings, illustrated is an example of conventional seat slide device of this kind. In this particular device, a roller (50) is disposed between a lower rail (112) and an upper rail (114), and a steel ball (122) is embraced by both inwardly bent end (128) of the upper rail (114) and outwardly bent end (124) of the lower rail (112). It is, then, understandable that a vertical force is exerted on the roller (50) whereas vertical and transverse forces are exerted on the steel ball (122).

The advantage of such prior art, therefore, is found in no possibility of the upper rail (114) being dislocated vertically or laterally relative to the lower rail (112), allowing the former rail to smoothly slide along the latter rail.

Although not shown in the drawings, a locking structure is in most cases arranged in the foregoing seat slide device, such that a plurality of equidistant projected pieces are formed on the upper rail (114) and a plurality of lock apertures are formed in the lower rail (112) in correspondence with the respective projected pieces, whereby the upper rail (114) can be locked at a desired position on the lower rail (112) when the projected pieces are brought to engagement into the respective lock apertures.

In the above-mentioned device per se, there is no problem in the case of a sudden accident like a collision taking place, with a great load applied thereto. This is particularly the case when a seat belt is not attached around the body of an occupant on the seat. The reason is that, in such accident, the upper and lower rails (114)(112) are given a maximum load only when the occupant is forced backwards to hit his body to the seat back of his seat provided on those rails, at which time, due to such load upon the seat back, an upward pulling force is exerted on the forward point where the forward end portion of the seat is connected with the corresponding portion of the upper rail (114) while at the same time a downward pressing force is exerted on the rearward point where the rearward end portion of the seat is connected with the corresponding portion of the upper rail (114), but the former pulling force (designated by "F" in FIGS. 1 and 2), although tending to remove away the forward end portion of the upper rail (114) from the lower rail (112) in an arrow direction as in FIG. 1, is not so sufficiently great as to remove the upper rail (114). Therefore, the seat slide device is not damaged in such case.

However, in view of the recent circumstances where attaching seat belt is a mandatory legal requirement for drivers who sit on automotive seats, it is true that every automobile has seat belts mounted therein, and when it is desired to fix one end of the seat belt to the seat frame of the seat or the upper rail of the seat slide device, the aforementioned type of conventional seat slide device is not rigid enough to resist such upward pulling force caused by a collision accident or the like.

In other words, when a seat belt is fixed to the upper rail (114) or the seat frame disposed thereon, in case of a collision accident occuring, the seat belt, which restrains an occupant to the seat, is pulled by the force inertia force of the occupant, transmitting a maximum pulling force to the seat slide device. In this case, a downward pressing force is exerted on the above-discussed forward point (a point where the forward end portion of the seat is connected with the upper rail (114)), and an upward pulling force is exerted on the above-discussed rearward point (a point where the rearward end portion of the seat is connected with the upper rail (114)). The latter upward pulling force is far greater than the above-mentioned upward pulling force which is caused in the case of non-attaching the seat belt, as a result of which, as shown in FIG. 2, the upper rail (114) is forcibly moved upwards, with the inwardly and outwardly bent ends (128) (129) of the lower rail (112) being deformed, increasing the possibility of the upper rail (114) being removed out of the lower rail (112). If the upper rail (114) is removed from the lower one (112), it will be inevitable that the occupant will be thrown out forwardly together with the seat into a terrible fatality.

To solve this problem, there are some conventional device having a great cross-section of upper rail and lower rail, or the upper ad lower rails of thick steel plate to reinforce its rigidity in order to avoid deformation of those rails as well as removal of the upper rail. But, these proposals have been found defective in that such great cross section results in unfavorable big dimensions of the device as it takes up a large space, and further increased weight thereof, and such thick rails also lead to the same result.

SUMMARY OF THE INVENTION

It is a purpose of the present invention to provide an improved seat slide device whose rigidity is effectively reinforced in a simple manner without need for designing a large and weight-increased structure, so as to prevent the removal of an upper rail from a lower rail.

In order to achieve the above purpose, the present invention consists essentially of an upper rail, a lower rail, and a reinforcing member, the lower rail being slidably fitted to the upper rail such that it encloses the latter upper rail, and the reinforcing member being fixed to the upper rail, with the arrangement that the lower rail is at its upper end portion formed with an inverted U-shaped flange which includes engagement means having a recessed portion, and the reinforcing member includes a plurality of spaced-apart claw members each having an inwardly directed protrusion, wherein the inverted U-shaped edge is disposed over the spaced-apart claw member.

With the above-described construction, it is seen that, when a load is applied to the upper rail, tending to remove the upper rail out of the lower rail, the protrusions of the claw members are brought to engagement with the recessed portion of the engagement means of the lower rail, whereby such engagement prevents removal of the upper rail from the lower rail.

In another aspect of the present invention, the engagement means of the lower rail are provided with stopper means which serve to prevent the longitudinal displacement of the upper rail relative to the lower rail at the time when the protrusions of the claw members are engaged with the recessed portion of the engagement means.

DETAILED DESCRIPTION OF PREFERRED EMBODIMENTS OF THE INVENTION

Figure 1:
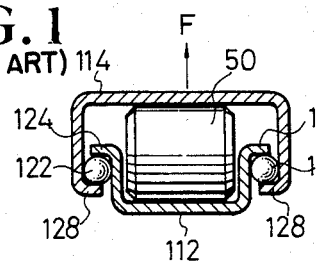
FIG. 1 is a cross-sectional view of a conventional seat slide device, showing the state in which no pulling force (F) is applied thereto.
Figure 2:
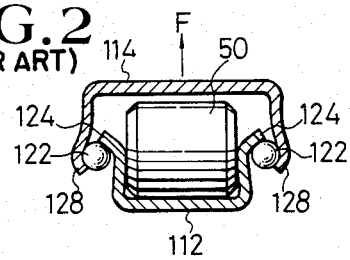
FIG. 2 is a cross-sectional view of the same conventional seat slide device, showing the state in which pulling force (F) has been applied thereto.
Figure 3:
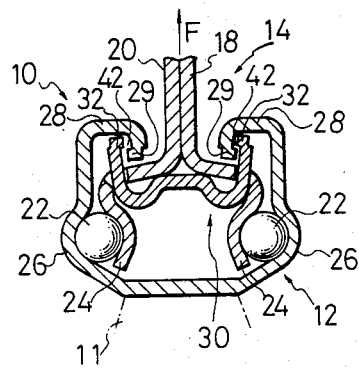
FIG. 3 is a cross-sectional view of a seat slide device in accordance with the present invention, showing the state in which no pulling force (F), is applied thereto.
Figure 4:
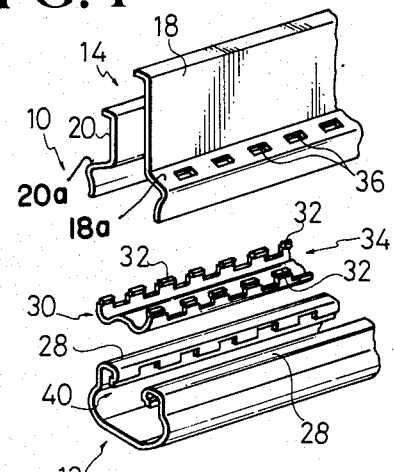
FIG. 4 is an exploded perspective view of the seat slide device in accordance with the present invention.

Referring to FIGS. 3 and 4, is illustrative of a seat slide device (10) in accordance with the present invention. The seat slide device (10) comprises a lower rail (12) to be fixed to a floor (11) of an automobile, an upper rail (14) to be fixed to the bottom surface of a seat (not shown), the upper rail (14) being slidably fitted to the lower rail (12), and a reinforcing member (30) fixed to the upper rail (14).

Figure 5:
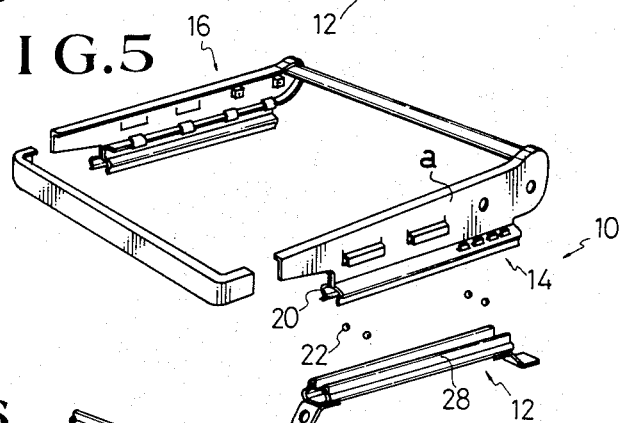
FIG. 5 is an exploded perspective view of the seat slide device of the present invention which is assembled together with a seat frame.
Figure 6:
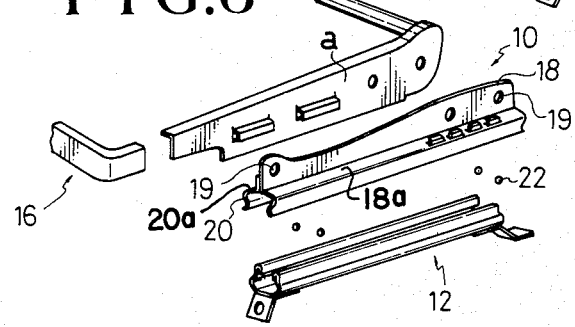
FIG. 6 is an exploded perspective view of the seat slide device of the present invention which is assembled independently of the seat frame.

The upper rail (14) may be assembled integrally with a seat frame (16) (See FIG. 5), or assembled independently of the seat frame (16) (See FIG. 6).

Hereinafter, description will be given, with particular reference to such independently formed seat as shown in FIG. 6.

As illustrated, the upper rail (14) is comprised of a base plate (18) and an auxiliary plate (20). Both base and auxiliary plates (18)(20) are welded together such that their respective lower portions extend downwardly in a symmetrical distant relation and terminate in inwardly arc-shaped end portions (24). Further, each of the base and auxiliary plates (18)(20) has a shoulder portion (18a, 20a) in which formed are a plurality of rectangular holes (36).

The lower rail (12) is basically formed by bending a unitary steel plate into a substantially U-shaped configuration, with an outwardly arc-shaped guide passage (26) formed midway in each of the vertical side walls of thus-formed lower rail (12) and an inverted U-shaped flange (28) integrally formed in each of the upper end portions of the lower rail (12).

The above-mentioned upper and lower rails (14)(12) are assembled together in such a manner that the lower rail (12) encloses the upper rail (14) and steel balls (22) are embraced by both the inwardly arc-shaped end portions (24) of the upper rail (14) and outwardly arc-shaped guide passage (26) of the lower rail (12).

The upper rail (14) is at its base plate (20) fixedly secured to the seat frame (16) by inserting such securing means as a bolt through a hole (19) perforated in the base plate (18).

It is seen that the provision of the steel balls (22) between the upper and lower rails (14)(12) is effective in resisting a transverse force applied to the upper and lower rails (14)(12). It may be arranged that at least one roller (not shown) is disposed between the interior of the upper rail (14) and the bottom portion of the lower rail (12). In this way, it is possible to provide both vertical-force and transverse-force resistances in the upper and lower rails (14)(12) so that the upper rail (14) can be smoothly slidingly moved on the lower rail (12) without any vertical and transverses dislocation.

As best shown in FIG. 4, the reinforcing member (30) has a plurality of claw members (32) projecting upwardly therefrom, the arrangement of the claw members (32) being such that they constitute a pair of rows respectively provided along the right and left ends of the reinforcing member (30) in a symmetrical fashion, with the claw members (32) per se being spaced apart from each other at a certain distance longitudinally of their respective rows. Preferably, the claw members (32) are formed at a pitch corresponding to respective lock apertures (not shown) formed in the seat slide device (10).

The claw members (32) are not limited to this embodiment, but may be formed only in one end of the reinforcing member (30).

Thus-constructed reinforcing member (30) is fixed to the lower portion of the upper rail (14) by means of welding or the like in an integral manner, such that the claw members (32) are respectively inserted through each of the rectangular holes (36), projecting upwardly therefrom.

Figure 7:
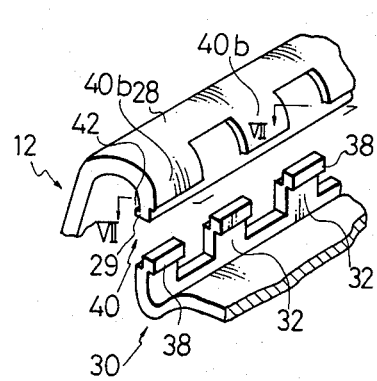
FIG. 7 is a partially exploded perspective view of a lower rail and reinforcing member in accordance with the present invention.

As best shown in FIG. 7, each of the claw members (32) is provided at its upper end with a protrusion (38) directed inwardly of the reinforcing member (30).

It should be noted that the lower rail (12) is slidably fitted to the upper rail (14) in a manner enclosing the upper rail (14) such that the inverted U-shaped flange (28) of the lower rail (12) extends over and circumscribes the upper portions of the claw members (32) of the reinforcing member (30).

The inverted U-shaped flange (28) is formed at its forward end with engagement means (40) in a longitudinal direction thereof, which engagement means (40) are adapted to be interengageable with the protrusions (38) of the claw members (32). In the present embodiment, as shown in FIGS. 3 and 7, the engagement means (40) include a projection (29) formed at the terminating edge of the inverted U-shaped flange (28) in such a manner as to project therefrom in a direction inwardly of the inverted U-shaped flange (28) towards the claw members (32), and a recessed portion (42) defined between the projection (29) and inner surface of the flange (28) so as to be disposed above the projection (29).

The recessed portion (42) is so designed that it will receive the protrusions (38) of the claw members (32).

In addition, the engagement means (40) are provided with stopper means (44) which are adapted to prevent the longitudinal displacement of the upper rail (14) relative to the lower rail (12) when the the protrusions (38) of the claw members (32) are brought to engagement with the recessed portion (42) of the engagement means (40).

Both recessed portion (42) and engagement means (40) can easily be obtained by press forming the lower rail (12) in a proper manner.

The stopper means (44), in particular, are formed by subjecting to a press working process the inverted U-shaped flange (28) where it is adjacent to the engagement means (40) so as to provide a plurality of dent portions (44a) in the inner surface of the inverted U-shaped flange (28) at an interval corresponding to each of the claw members (32). It is observed here that at the outer surface of the inverted U-shaped flange (28), formed also are a corresponding number of raised portions (44b) at points corresponding to the dent portions (44a), which effectively adds to the rigidity of the inverted U-shaped flange (28).

Designation (a) denotes an area for connecting with an end of a seat belt (not shown).

Now, when a collision accident or the like occurs, an occupant on the seat is forced out forwardly from the seat, giving a pulling force to his or her seat belt. Then, a great upward pulling force is exerted upon the upper rail (14), tending to remove the same out of the lower rail (12). More precisely speaking, the upper rail (14) is given an upward component force and a forward component of force, namely, a diagonal forward vector of the pulling force. Thus, the upper rail (14) is caused to move in a diagonal forward direction. This means a great possibility of the upper rail (14) being not only dislocated longitudinally relative to the lower rail (12), but also being removed upwardly away from the lower rail (12).

Figure 8:
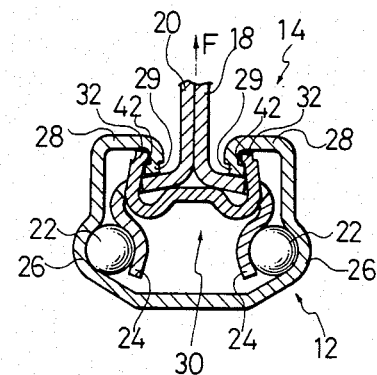
FIG. 8 is a cross-sectional view of the seat slide device in accordance with the present invention, showing the state in which a pulling force (F) has been applied thereto.
Figure 9:
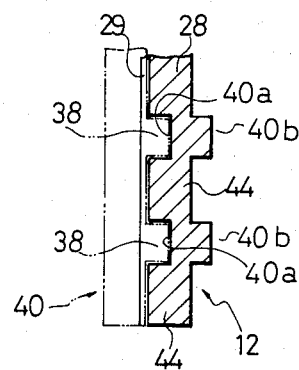
FIG. 9 is a longitudinally sectional view taken along the line VII—VII in the FIG. 7.

Assuming that the pulling force (F) is of the foregoing nature, both upper rail (14) and reinforcing member (30) are moved slidingly in a forward direction along the inverted U-shaped flange (28), and at the same time, they are moved upwardly with the result that the protrusions (38) of the claw members (32) are brought to contact with the inner surface of the inverted U-shaped flange (28), whereupon established is a positive interengagement between the upper and lower rails (14)(12). (See FIG. 8) Due to such interengagement of both rails (14)(12), the upper rail (14) is prevented against its vertical movement, and thus against its removal out of the lower rail (12), and furthermore, a friction is created between the protrusions (38) and the inner surface of the inverted U-shaped flange (28), which prevents the longitudinal movement of the upper rail (14), thus avoiding a forward dislocation of the upper rail (14) relative to the lower rail (12).

Thereafter, as the pulling force (F) continues to be exerted on the upper rail (14), both right and left rows of claw members (32) are respectively so pressed against the inverted U-shaped flange (28) as to be bent outwardly, while on the other hand, the right and left inverted U-shaped flanges (28) are also bent outwardly to a greater degree than those claw members (32), because of the balls (22) being pressed upwardly by the inwardly arc-shaped end portions (24) of the upper rails (14), to thereby press and bend the respective flanges (28) outwardly with respect to the center axis of the balls (22). As a result, the protrusions (38) of the claw members (32) are brought into engagement with the recessed portions (42) of the engagement means (40), respectively, and further the protrusions (38) are received in the dent portions (40a), respectively. This engagement insures far more positively to prevent the longitudinal dislocation of the upper rail (14) relative to the lower rail (12) as well as the further upward movement of the upper rail (14) from the lower one (12). It is therefore appreciated that, the greater is the pulling force (F) applied to the upper rail (14), the more firmly is engaged the protrusions (38) with both recessed portions (42) and dent portions (40a), so that the present invention is quite rigid structurally enough to resist a high pulling force. Consequently, any further upward movement of the upper rail (14) and reinforcing member (3) is almost completely prevented, and thus, the upper rail (14) is assuredly prevented against its removal from the lower rail (12).

In addition, such engagement of the protrusions (30) with both recessed portions (42) and dent portions (40a) is a simple yet most firm, which is a good answer to tide over deformation problems. Accordingly, there is no need to design a great cross-section of the upper and lower rails and the present invention can be formed of a thin steel plate, so that the seat slide device (10) per se is of quite small size and relatively reduced weight, with a sufficient rigidity.

The engagement means (40) are not limited to the illustrated embodiments, but may be formed in various ways so long as they are so designed as to be engageable with the protrusions (38) of the claw members (32) for the purpose of avoiding the removal of the upper rail (14) from the lower rail (12).

Figure 10:
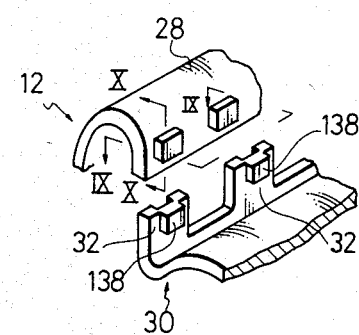
FIG. 10 is a partially exploded perspective view showing a lower rail and reinforcing member in accordance with a second embodiment of the present invention.
Figure 11:
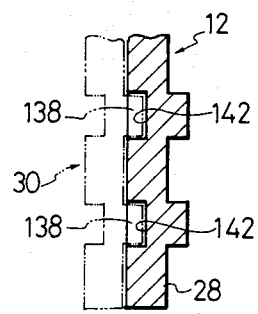
FIG. 11 is a longitudinally sectional view taken along the line IX—IX in the FIG. 10.
Figure 12:
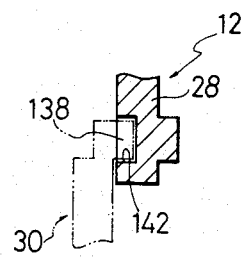
FIG. 12 is a cross-sectional view taken along the line X—X in the FIG. 10.

FIGS. 10 through 12 illustrate another exemplary form of engagement between the claw members (32) and inverted U-shaped flange (28), in which the claw members (32) are each formed at the upper end thereof with a raised portion (138) projecting inwardly of the reinforcing member (30), and the inverted U-shaped flange (28) is at its downwardly extending forward end portion formed with a plurality of recessed portions (142) so arranged that each of them is disposed in the inner surface of the flange (28) at a point corresponding to the respective raised portions (138). According to this embodiment, the the raised portions (138) are to be engaged with the respective recessed portions (142).

Figure 13:
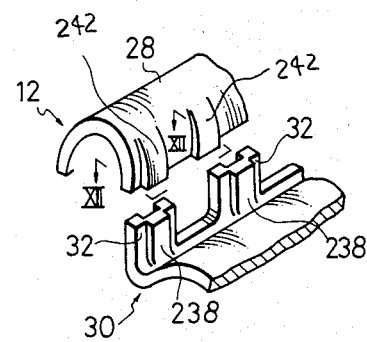
FIG. 13 is a partially exploded perspective view showing a lower rail and reinforcing member in accordance with a third embodiment of the present invention.
Figure 14:
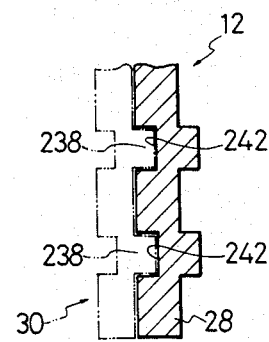
FIG. 14 is a longitudinally sectional view taken along the line XII—XII in the FIG. 13.

FIGS. 13 through 14 illustrate still another form of engagement between the claw members (32) and inverted U-shaped flange (28), in which the claw members (32) are each formed with a longitudinally extending raised portion (238) which runs from the foot portion up to the top of the claw member (32), and the inverted U-shaped flange (28) is formed with a plurality of elongated recessed portions (242) which are so formed that each of them runs in the inner surface of the flange (28), extending from the forward end to the most curved top portion of the flange (28), and is disposed at a point corresponding to the respective raised portions (238).

The above-mentioned two embodiments shown in FIGS. 10–14 are preferably formed by means of a press working method.

While, in the embodiments that have been described before, the seat slide device (10) is provided on the right and left sides of the seat, it is not always necessary to provide the device (10) in such fashion, depending on the design of the seat.

The description above has just been given of preferred embodiments of the present invention, but it should be understood that the invention is not limited to the embodiments illustrated but other replacements, modifications and additions may structurally be possible without departing from the spirit of the appended claims for the invention.

What is claimed is:

1. A seat slide device, which has a lower rail to be fixed to a floor of an automobile and an upper rail to be fixed to a seat, the upper rail being slidably fitted to the lower rail, said seat slide device comprising:
   a reinforcing member fixed to said upper rail, said reinforcing member having a plurality of claw members which are spaced apart from each other at a predetermined distance;
   each of said claw members having a protrusion which projects inwardly thereof;
   an inverted U-shaped flange formed in an upper end portion of said lower rail; and
   engagement means provided in said inverted U-shaped flange, said engagement means including a plurality of recessed portions adapted to be engageable with said protrusions of said claw members,
   wherein said lower rail is slidably fitted to said upper rail in a manner enclosing the upper rail such that said inverted U-shaped flange of the lower rail is disposed above said claw members of said reinforcing member,
   whereby, when a pulling load is applied to said upper rail, tending to remove said upper rail from said lower rail together with said reinforcing member, said protrusions of said claw members are respectively engaged with said recessed portions of said engagement means, to thereby prevent removal of said upper rail from said lower rail.

2. The device according to claim 1, wherein said engagement means are provided with stopper means adapted to prevent a longitudinal dislocation of said upper rail relative to said lower rail when said protrusions of said claw members are engaged with said recessed portions of said engagement means.

3. The device according to claim 1, wherein said upper rail is integrally formed with a seat frame of said seat.

4. The device according to claim 1, wherein said upper rail comprises a base plate and an auxiliary plate, the formation of the base and auxiliary plates being such that they extend downwardly in a symmetrically spaced-apart relationship and terminate respectively in an inwardly arc-shaped end portion, wherein said lower rail is formed by bending a unitary rigid plate, with an outwardly arc-shaped portion formed midway in each of vertical side walls of said lower rail and said inverted U-shaped flange formed in each of upper end portions of said lower rail and wherein a ball is embraced by and between said inwardly arc-shaped end portion and said outwardly arc-shaped portion.

5. The device according to claim 1, wherein said claw members of said reinforcing member are so arranged that they constitute a pair of rows respectively provided along the right and left sides of said reinforcing member and are spaced apart form each other longitudinally of their respective rows at a pitch corresponding to respective lock apertures formed in said lower rail.

6. The device according to claim 1, wherein said reinforcing member is fixed to lower portion of said upper rail in such a manner that said claw members are respectively inserted through each of rectangular holes formed in said base and auxiliary plates, projecting upwardly therefrom.

7. The device according to claim 1, wherein said engagement means includes a projection formed at an end of said inverted U-shaped flange in a manner projecting therefrom in a direction inwardly of said inverted U-shaped flange towards said claw members, and a recessed portion defined between said projection and inner surface of said flange so as to be disposed above said projection.

8. The device according to claim 1, wherein said claw members are each formed with a raised portion projecting inwardly of said reinforcing member and said inverted U-shaped flange is formed with a recessed portion to be engageable with said raised portion, by means of a press working method.

9. The device according to claim 1, wherein said claw member are each formed with a longitudinally extending raised portion which runs from a lower portion of said claw member to a top portion of the same and wherein said inverted U-shaped flange is formed with a plurality of elongated recessed portions which run from a forward end of said flange to a most curved top portion of the same, said elongated recessed portions being engageable with said longitudinally extending raised portion.

* * * * *